(12) United States Patent
Yokota et al.

(10) Patent No.: US 6,269,634 B1
(45) Date of Patent: Aug. 7, 2001

(54) ENGINE CONTROL DEVICE (75) Inventors: Kazuya Yokota; Junichi Taga; Youichi Kuji; Masayuki Kuroki; Akihide Takami; Kenji Okamoto; Hiroshi Yamada; Makoto Kyougoku; Seiji Miyoshi, all of Fuchu-cho (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/497,431

(22) Filed: Feb. 3, 2000

(30) Foreign Application Priority Data

Feb. 5, 1999 (JP) .................................................. 11-029219

(51) Int. Cl.$^7$ ........................................................ F01N 3/00
(52) U.S. Cl. ................................ 60/286; 60/278; 60/277; 60/285; 123/300; 123/443
(58) Field of Search ............................ 60/285, 286, 303, 60/297, 278, 277; 123/443, 300

(56) References Cited

U.S. PATENT DOCUMENTS

| 5,724,808 | * | 3/1998 | Ito et al. ................................ 60/276 |
| 5,850,735 | * | 12/1998 | Araki et al. ............................ 60/274 |
| 5,910,096 | * | 6/1999 | Hepburn et al. ....................... 60/274 |
| 5,974,788 | * | 11/1999 | Hepburn et al. ....................... 60/274 |
| 5,975,046 | * | 11/1999 | Kaneko et al. ....................... 123/300 |
| 5,992,142 | * | 11/1999 | Pott ....................................... 60/274 |
| 6,014,859 | * | 1/2000 | Yoshizaki et al. ..................... 60/285 |
| 6,058,700 | * | 5/2000 | Yamashita et al. .................... 60/285 |

FOREIGN PATENT DOCUMENTS

| 06066129 | 3/1994 | (JP) . |
| 06229322 | 8/1994 | (JP) . |
| 10151353 | 6/1998 | (JP) . |
| 11107740 | 4/1999 | (JP) . |

* cited by examiner

Primary Examiner—Thomas Denion
Assistant Examiner—Binh Tran
(74) Attorney, Agent, or Firm—Brooks & Kushman P.C.

(57) ABSTRACT

An engine control device, which is adapted for an engine provided with an NOx-absorbing material arranged in an exhaust passage for absorbing NOx in an oxygen-rich atmosphere, and releasing NOx and absorbing sulfur content when the oxygen concentration drops, includes a discriminator for judging whether the amount of sulfur absorbed by the NOx-absorbing material has reached a prescribed quantity, and a reductant concentration controller which increases the temperature of the NOx-absorbing material by decreasing a quantity related to EGR ratio for desulfurizing the NOx-absorbing material based on the result of judgment made by the discriminator. When the quantity related to the EGR ratio is decreased, the temperature of exhaust gas increases. Consequently, the temperature of the NOx-absorbing material increases and the sulfur in the NOx-absorbing material is freed and released.

18 Claims, 8 Drawing Sheets

ENGINE CONTROL DEVICE

This application is based on patent application No. 11-29219 filed in Japan, the contents of which are hereby incorporated by references.

BACKGROUND OF THE INVENTION

This invention relates to an engine control device capable of reducing the sulfur content in exhaust gases from an engine.

One of well-known techniques for reducing nitrogen oxides (NOx) contained in engine exhaust gases is exhaust gas recirculation (EGR), in which part of the exhaust gas is returned to an intake air line as described in Japanese Unexamined Patent Publication No. 6-229322, for instance.

In an engine in which the air-fuel ratio is increased to produce a lean air-fuel mixture in a particular operating range, it is a common practice to provide an NOx-absorbing material which absorbs NOx contained in exhaust gas emissions when the air-fuel ratio is high and releases the NOx when the concentration of oxygen in the exhaust gas has dropped so that the released NOx is converted through a reduction reaction. As an example, this approach is used in a direct injection engine whose injector injects fuel directly into a combustion chamber during a compression stroke to produce stratified charge combustion in a low-load range. The NOx-absorbing material of the aforementioned type has such properties that it absorbs sulfur oxides (SOx) more easily than the NOx in the exhaust gas emissions when fuel or engine oil containing sulfur constituents produced in particular areas is used. The NOx-absorbing ability of the NOx-absorbing material is considerably degraded once it has been poisoned by absorbing the SOx.

Japanese Unexamined Patent Publication No. 6-066129 discloses a technique for overcoming such poisoning of an NOx-absorbing catalyst by SOx by increasing catalyst temperature when the concentration of sulfur in the NOx-absorbing catalyst is high. This technique uses an electric heater for increasing the catalyst temperature.

Another approach to the solution of the SOx poisoning problem is disclosed in Japanese Unexamined Patent Publication No. 11-107740, in which an NOx-absorbing catalyst is provided in an exhaust passage of a direct injection lean-burn gasoline engine, and the fuel is injected twice during a period from an intake stroke to a succeeding compression stroke to produce exhaust gas which is rich in carbon monoxide (CO) to thereby eliminate sulfur deposited in the NOx-absorbing catalyst.

As stated above, the technique disclosed in Japanese Unexamined Patent Publication No. 6-066129 requires the electric heater for increasing the catalyst temperature. This approach is not desirable from the viewpoint of space and cost savings. On the other hand, the approach of Japanese Unexamined Patent Publication No. 11-107740 makes it necessary to increase the catalyst temperature even more effectively, which is not desirable either.

SUMMARY OF THE INVENTION

It is an object of the invention to provide an engine control device which has overcome the problems residing in the prior art.

It is another object of the invention to provide an engine control device which makes it possible to achieve space savings without causing cost increase.

In one aspect of the invention, an engine control device is adapted for controlling an engine provided with a fuel injection valve for supplying fuel to the engine, an EGR regulator for recirculating part of exhaust gas to an intake air line of the engine, an NOx-absorbing material arranged in an exhaust passage for discharging the exhaust gas from a combustion chamber of the engine for absorbing NOx in an oxygen-rich atmosphere while releasing NOx and absorbing sulfur content when the oxygen concentration drops. The engine control device includes a discriminator for judging whether the a mount of sulfur absorbed by the NOx-absorbing material has reached a prescribed quantity, and a desulfurization controller for causing the EGR regulator to decrease the EGR ratio to increase the temperature of the NOx-absorbing material and thereby desulfurizes the NOx-absorbing material when the amount of sulfur absorbed by the NOx-absorbing material is judged to have reached or exceeded the prescribed quantity based on the result of judgment made by the discriminator.

Other features of the present invention will be more readily understood from the following detailed description when read in conjunction with accompanying drawings.

DETAILED DESCRIPTION OF THE PREFERRED EMBODIMENTS OF THE INVENTION

An engine control device according to a preferred embodiment of the invention is now described with reference to the accompanying drawings.

Figure 1:
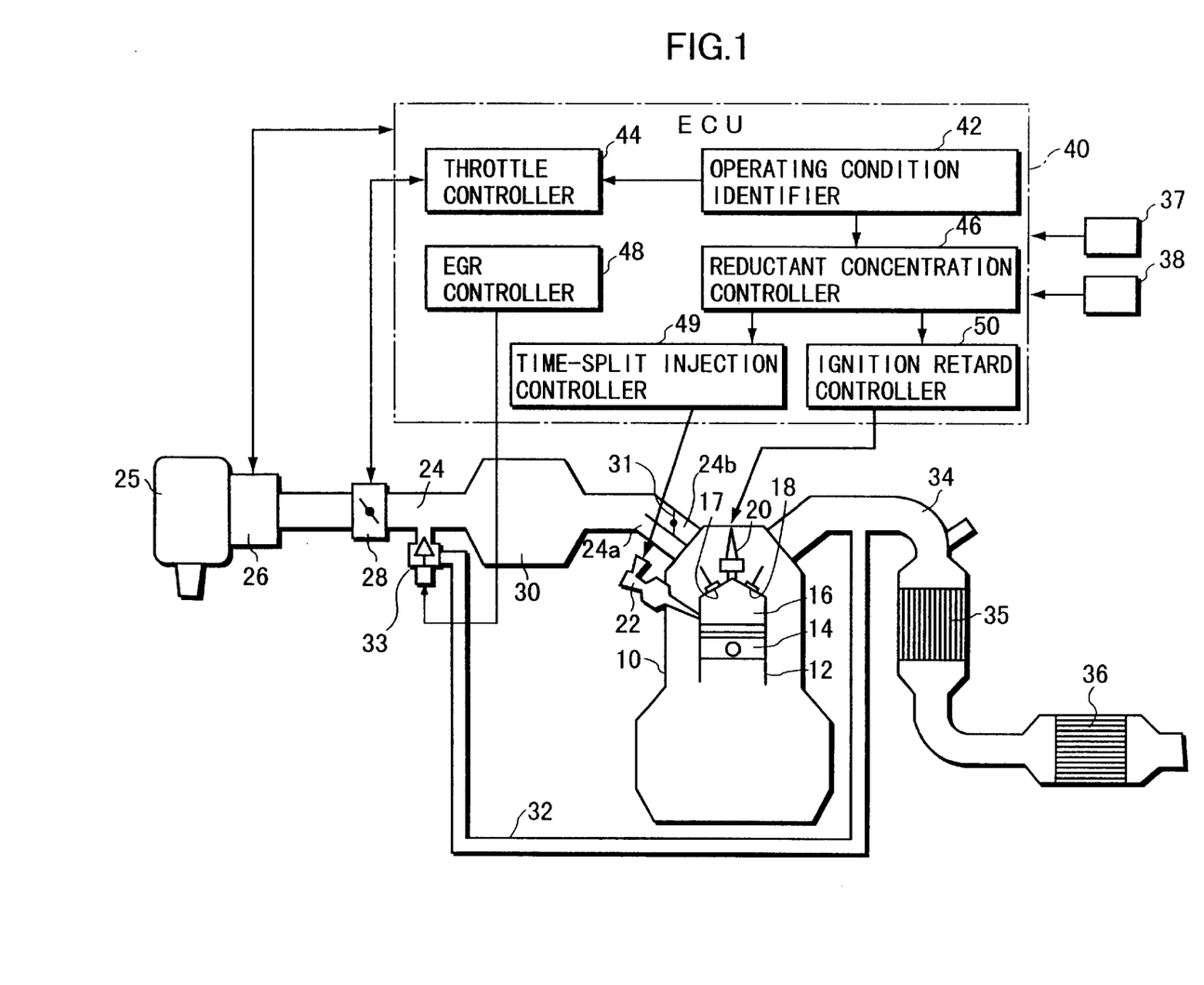
FIG. 1 is a general construction diagram of an engine according to an embodiment of the invention.

Referring to FIG. 1, an engine body 10 has a plurality of cylinders 12. A piston 14 is fitted in each cylinder 12 and a combustion chamber 16 is formed above the top surface of the piston 14. In this embodiment, two each intake ports and exhaust ports open into the combustion chamber 16. These intake ports and exhaust ports are opened and closed by intake valves 17 and exhaust valves 18, respectively.

A spark plug 20 is provided at the top of the combustion chamber 16 in each cylinder 12 in such a way that a spark gap of the spark plug 20 is located inside the combustion chamber 16. An injector 22 is fitted in one side of the combustion chamber 16 with an extreme end (fuel injecting part) of the injector 22 located in the combustion chamber 16 so that fuel can be injected directly from the injector 22 into the combustion chamber 16. This engine is therefore a direct injection engine. The injector 22 of each cylinder 12 incorporates a needle valve and a solenoid which are not illustrated. The injector 22 injects a specific amount of fuel which is determined by the pulselength of a later-described pulse signal at the time when the pulse signal is entered to the solenoid.

The aforementioned intake ports are connected to an intake passage 24. An air cleaner 25, airflow sensor 26, an electric throttle unit 28 including a throttle sensor and a throttle valve, and a surge tank 30 are provided in this order in the intake passage 24 from its upstream side to downstream side. The intake passage 24 branches into independent intake passages downstream of the surge tank 30.

In the example illustrated in FIG. 1, downstream portions of each independent intake passage branches into first and second channels 24a, 24b which are connected to the combustion chamber 16, and an on/off valve 31 for producing a swirl is provided only in the second channel 24b. This on/off valve 31 is opened and closed by an actuator (not shown). When the on/off valve 31 closes off the second channel 24b, a swirl is produced in the combustion chamber 16 by intake air introduced through the first channel 24a alone. The swirl becomes less intense as the opening of the on/off valve 31 increases.

On the other hand, the aforementioned exhaust ports are connected to an exhaust passage 34. A three-way catalytic material 35 and a lean NOx catalytic material 36, that is, NOx-absorbing material 36, are provided in this order in the exhaust passage 34 from its upstream side. Each of these catalytic materials 34, 35 includes a cordierite carrier (not shown) of a honeycomb structure in which a number of through holes extending parallel to each other are made in its axial direction, with a catalyst layer formed on wall surfaces of the individual through holes.

The three-way catalytic material 35 converts NOx, CO and hydrocarbons (HC) contained in exhaust gas when its air-fuel ratio is approximately equal to the stoichiometric air-fuel ratio. Compared to this, the NOx-absorbing material 36 absorbs NOx under lean conditions in which the excess-air factor of the exhaust gas is large and releases the absorbed NOx under rich conditions in which the excess-air factor of the exhaust gas is small. The NOx-absorbing material 36 exhibits greater converting performance when the exhaust gas temperature falls in a particular range which is lower than exhaust gas temperatures suited for the operation of the three-way catalytic material 35. A preferable example of this kind of NOx-absorbing material is disclosed in Japanese Unexamined Patent Publication No. 10-151353, for example, in which an inner catalyst layer formed of alumina containing noble metal like platinum and alkaline earth metal like barium and an outer catalyst layer formed of zeolite containing platinum and rhodium are deposited on a carrier. Also, it is preferable that the NOx-absorbing material 36 be of a type containing ceria ($CeO_2$). When the NOx-absorbing material 36 contains ceria, it is possible to gradually release oxygen ($O_2$) absorbed under lean conditions by making the exhaust gas richer ($\lambda \leq 1$), and maintain the NOx-absorbing material 36 at high temperatures achieved by time-split injection, for instance, by causing the oxygen released from ceria to react particularly with CO.

There is provided an EGR passage 32 for recirculating part of the exhaust gas between the intake passage 24 and the exhaust passage 34. An inflow end of the EGR passage 32 is connected to the exhaust passage 34 upstream of the three-way catalytic material 35, while an outflow end of the EGR passage 32 is connected to the intake passage 24 of an intake manifold downstream of the electric throttle unit 28 (but upstream of the surge tank 30). An EGR valve 33 is provided at the outflow end of the EGR passage 32. The EGR valve 33 regulates the amount of exhaust gas recirculated through the EGR passage 32.

This engine is provided with various sensors, such as an engine speed sensor 37 and an accelerator depression sensor 38, in addition to the earlier-mentioned throttle sensor and airflow sensor 26. Output signals (sensing signals) from these sensors are entered to an electronic control unit (ECU) 40, which comprises an operating condition identifier 42, a throttle controller 44, a reductant concentration controller 46, an EGR controller 48 and a time-split injection controller 49 (or an ignition retard controller 50).

Figure 2:
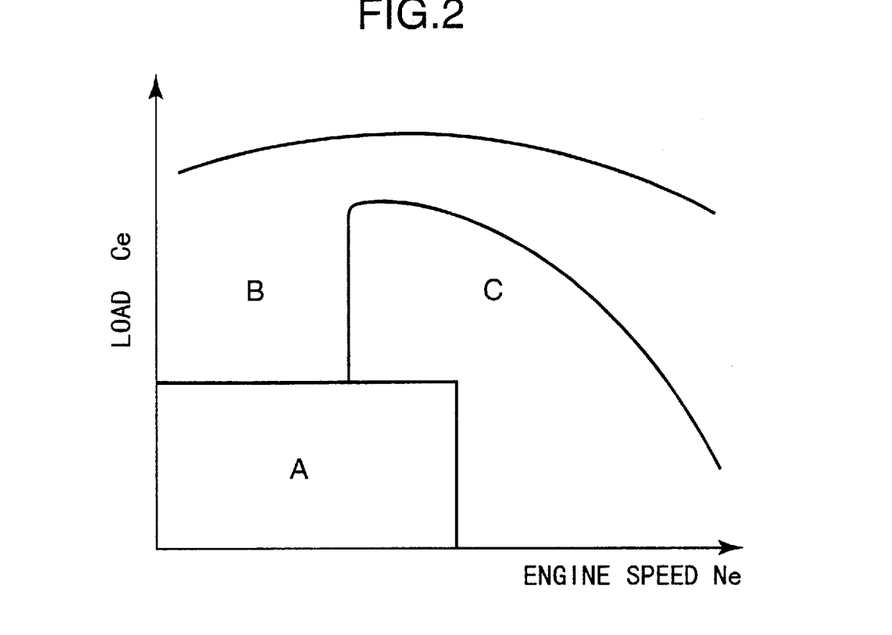
FIG. 2 is a graphical representation of individual operating ranges of the engine.

FIG. 2 is a chart showing operating ranges of the engine defined according to engine speed Ne and engine load Ce. The operating condition identifier 42 takes in the output signals from the aforementioned sensors and makes a judgment as to which operating range the engine is currently operated in.

In FIG. 2, region "A" represents a low/medium-speed, low-load operating range in which the amount of injected fuel is small. In the region A, the fuel is injected only once in a latter half of each compression stroke to produce stratified charge combustion, wherein the air-fuel ratio within the entire combustion chamber 16 is high (lean mixture) but a relatively rich mixture mass is locally present in an area immediately around the spark plug 20.

Region "B" in FIG. 2 represents a low-speed range in which the engine speed is less than a specified value and the engine load is higher than in the region A. In this region B, the fuel is injected once in each intake stroke to produce uniform charge combustion of a mixture whose excess-air factor $\lambda$ is equal to or smaller than 1 ($\lambda \leq 1$).

Region "C" in FIG. 2 includes a medium/high-speed, high-load operating range and a high-speed, low-load operating range in which the engine speed is equal to or higher than the specified value. Although uniform charge combustion is produced in the region C as in the region B, the fuel is injected more than once in each intake stroke. This form of time-split injection is referred to as time-split injection mode. In the region C, the fuel is injected more than once in each intake stroke so that the fuel is widely spread and well mixed with air to produce uniform charge combustion of a mixture whose excess-air factor $\lambda$ is equal to 1 ($\lambda=1$).

In a range w here the engine speed is high and the engine load is extremely high, it is difficult to inject the fuel in multiple steps within an intake stroke since the total amount of injected fuel is so large. This is why the region B of one-time injection mode extends to the high-speed side in the example shown in FIG. 2.

The throttle controller 44 controls the opening of the throttle valve of the electric throttle unit 28 based on the sensing signal fed back from the throttle sensor to regulate the amount of intake air so that it is suited for combustion in each engine operating range.

The reductant concentration controller 46 controls the concentration of reductant by adjusting the amount of injected fuel and injection timing. More specifically, the reductant concentration controller 46 performs, in addition to an ordinary control operation to make combustion suited to the operating range identified by the operating condition identifier 42, a control operation for eliminating NOx and SOx. When performing the latter control operation, the reductant concentration controller injection timing such that the amount of CO which serves as a reducing agent would increase, and outputs a command signal to an unillustrated injector driver, causing it to output a pulse signal whose pulselength corresponds to the amount of fuel to be injected to the injector 22 at the injection timing determined. In the present embodiment, this control operation for regulating the concentration of the reductant is carried out according to a flowchart shown in FIGS. 4 and 5 and specific commands derived from the control operation of the reductant concentration controller 46 are output to the EGR controller 48, the time-split injection controller 49 and/or the ignition retard controller 50, as will be described later.

The EGR controller 48 controls the opening of the EGR valve 33 such that the actual amount of exhaust gas recirculated through the EGR passage 32 coincides with a target value set for each engine operating range. In this embodiment, the EGR controller 48 performs, in addition to an ordinary EGR control operation for normal operating conditions, a control operation for reducing the amount of the recirculated exhaust gas via the EGR valve 33 when it has been judged that a control operation for desulfurization should be carried out in combination with the control operation performed by the reductant concentration controller 46.

When data on the amount of fuel to be injected in an earlier injection cycle and an earlier injection point as well as the amount of fuel to be injected in a later injection cycle and a later injection point obtained when the reductant concentration controller 46 performs its control operation is entered to the time-split injection controller 49, it causes the injector 22 to inject the specified amounts of fuel at the specified injection points in successive cycles.

When data on an ignition point derived by correcting a basic ignition point which is obtained when the reductant concentration controller 46 performs its control operation is entered to the ignition retard controller 50, it causes the spark plug 20 to ignite the mixture at the specified ignition point.

The reductant concentration controller 46, the EGR controller 48, the time-split injection controller 49 and the ignition retard controller 50 together constitutes a desulfurization controller which increases the temperature of the NOx-absorbing material 36 and supplies it with the reductant when the amount of sulfur absorbed by the NOx-absorbing material 36 has reached a prescribed quantity.

Figure 3:
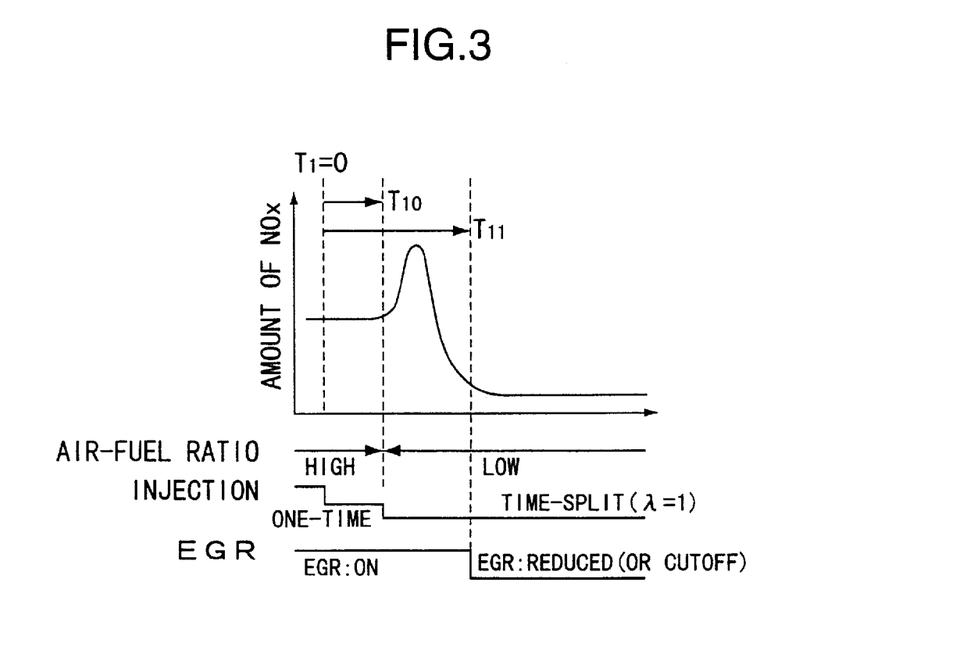
FIG. 3 is a time chart showing a control operation performed in the engine of the embodiment.
Figure 4:
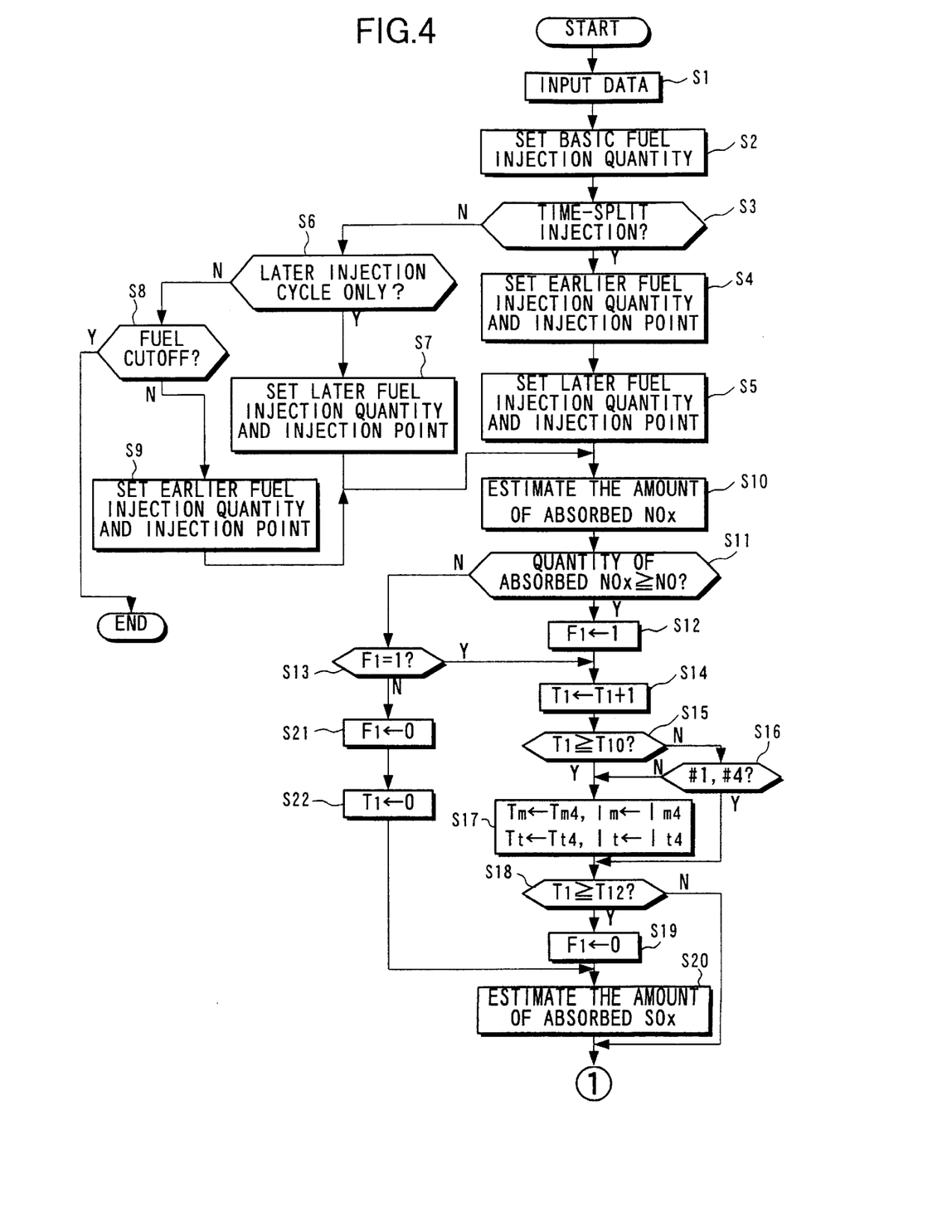
FIG. 4 shows a first part of a flowchart representing operational steps of a control operation performed in the engine for regulating the concentration of a reductant.
Figure 5:
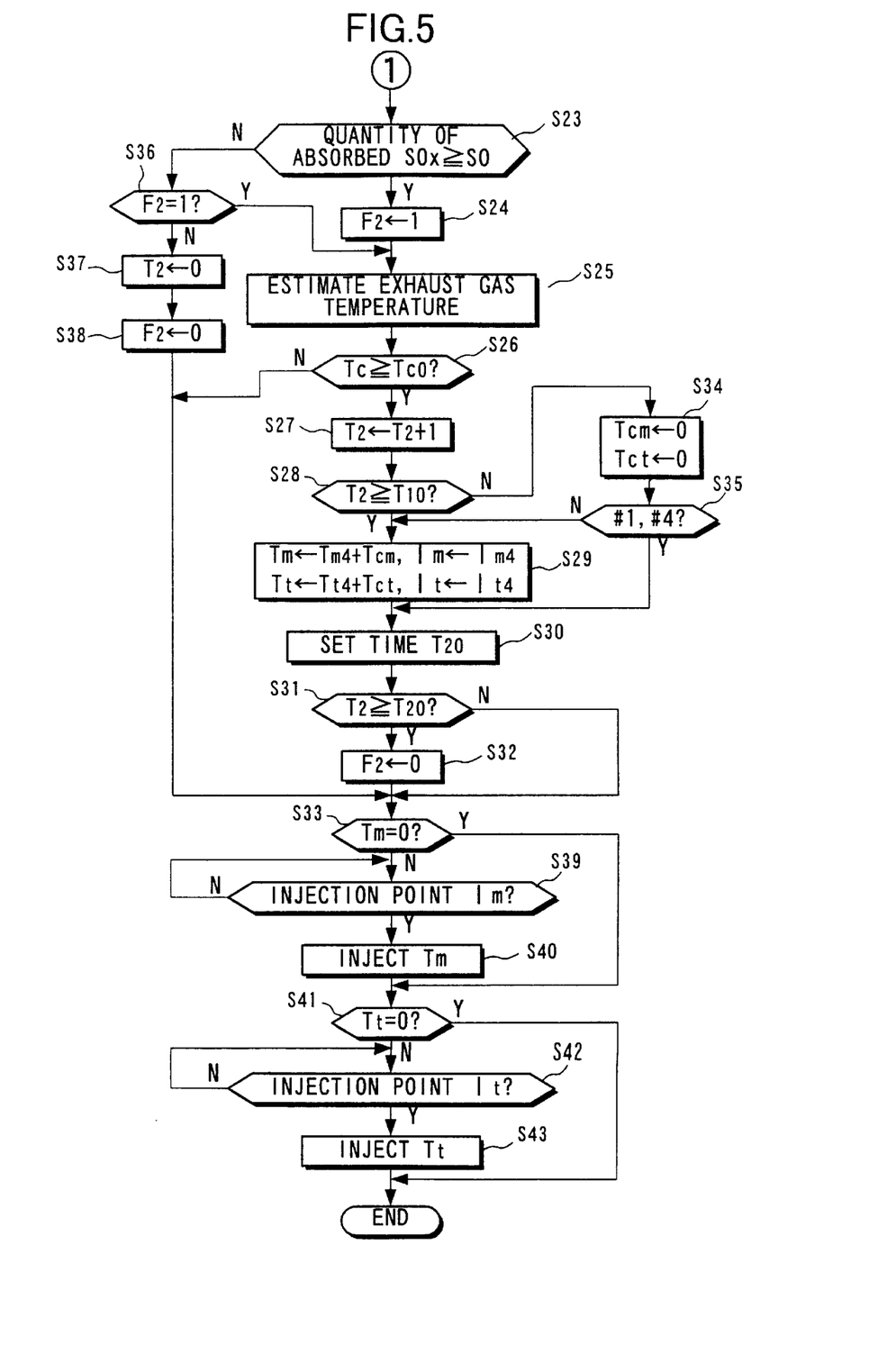
FIG. 5 shows a second part of the flowchart representing operational steps to follow FIG. 4.

Now, the reductant concentration control operation performed by the ECU 40 is described specifically referring to a time chart of FIG. 3 and the flowchart of FIGS. 4 and 5.

Referring to FIG. 4, the reductant concentration controller 46 initiates its control operation for each cylinder 12 of the engine with specific timing. Specifically, the reductant concentration controller 46 takes in such data as engine speed Ne, accelerator depression acc and the output of the airflow sensor 26 from the operating condition identifier 42 in step S1, and sets basic fuel injection quantity TB based on such data in step S2. The reductant concentration controller 46 sets an air-fuel ratio based on the engine speed Ne, accelerator depression acc and the current operating range (region A, B or C shown in FIG. 2) of the engine and calculates the basic fuel injection quantity TB using the air-fuel ratio, the amount of intake air and the engine speed Ne.

Next, a judgment is made as to whether time-split injection is currently made in step S3. If time-split injection mode is currently selected, the operation flow proceeds to step S4, in which the earlier fuel injection quantity Tm is set as an earlier fuel injection quantity basic value Tm1 and the earlier injection point Im is set as an earlier injection point basic value Im1 in step S4. Then in step S5, the later fuel injection quantity Tt is set as a later fuel injection quantity basic value Tt1 and the later injection point It is set as a later injection point basic value It1, and the operation flow proceeds to step S10. The earlier and later fuel injection quantity basic values Tm1, Tt1 are determined based on the basic fuel injection quantity TB and specified proportions of fuel to be injected in the earlier and later injection cycles.

On the other hand, if it is judged that the time-split injection mode is not currently selected in step S3, a judgment is made to determine whether the fuel is to be injected in the later injection cycle only in step S6. If the judgment result in step S6 is in the affirmative, the later fuel injection quantity Tt is set to Tt2 (the earlier fuel injection quantity Tm is set to 0) and the later injection point It is set to It2 (the earlier injection point Im is set to 0) in step S7, and the operation flow proceeds to step S10. If it is judged that the engine is in a fuel cutoff condition in step S8, the operation flow of FIG. 4 is terminated because no control operation needs to be carried out. If the judgment result in step S6 is in the negative and the engine is not in the fuel cutoff condition in step S8, the earlier fuel injection quantity Tm is set to Tm3 (the later fuel injection quantity Tt is set to 0) and the earlier injection point Im is set to Im3 (the later injection point It is set to 0) in step S9, and the operation flow proceeds to step S10. Initialization of the ECU 40 is finished by the foregoing steps.

Subsequently, the amount of absorbed NOx is estimated in step S10. This estimation is made based on the distance traveled under lean mixture conditions and the total amount of fuel (Qa) injected since an NOx release control operation was last executed. The estimated amount of the absorbed NOx is compared with its reference value NO in step S11. If the estimated amount of the absorbed NOx is equal to or greater than NO (the quantity of absorbed NOx≧NO), an NOx release control execute flag F1 is set in step S12. Then, count value T1 of a timer is incremented by 1 in step S13, and a judgment is made to check whether $T_1 \geq T_{10}$ in step S15, where $T_{10}$ represents a time period which elapses just before the NOx in the NOx-absorbing material 36 begins to be rapidly released as shown in FIG. 3. If $T_1 \geq T_{10}$ in step S15, the earlier fuel injection quantity Tm is set to Tm4, the later fuel injection quantity Tt is set to Tt4, the earlier injection point Im is set to Im4, and the later injection point It is set to It4 in step S17. In this case, the air-fuel ratio is set to a value approximately equal to the stoichiometric air-fuel ratio, i.e., excess-air factor λ is equal to 1. Then, the operation flow proceeds to step S18.

If $T_1 < T_{10}$ in step S15 and the engine is of a four-cylinder type, a judgment is made to determine whether the cylinder 12 into which the fuel is to be injected next is the first or fourth cylinder 12 in step S16. If the judgment result in step S16 is in the negative, that is, the fuel is to be injected into the second or third cylinder 12 next, the operation flow proceeds to step S17 to make time-split injection, and then to step S18. If the judgment result in step S16 is in the affirmative, that is, the fuel is to be injected into the first or fourth cylinder 12 next, the operation flow proceeds directly to step S18. This means that the first or fourth cylinder 12 is controlled in the same conditions as before (e.g., lean mixture conditions) and the second or third cylinder 12 is operated in the time-split injection mode at $\lambda \approx 1$ until the time period $T_{10}$ elapses. During a time period from $T_{10}$ to $T_{12}$, all the cylinders 12 are operated in the time-split injection mode at $\lambda \approx 1$. Time-split injection is made during a period from an intake stroke to a succeeding compression stroke. The earlier injection point Im and the later injection point It are set such that the earlier injection cycle occurs in a first half of the intake stroke and the later injection cycle occurs in a second half of the compression stroke, for example. As a consequence, some of the cylinders 12 are operated in the time-split injection mode to supply a large quantity of the reductant immediately before the time period from $T_{10}$ to $T_{11}$ during which a large quantity of NOx is produced, so that conversion of the NOx can accelerated. As shown in FIG. 3, $T_{11}$ represents a time period which elapses just before the EGR control operation is changed from the normal EGR amount to the reduced EGR amount.

Figure 6:
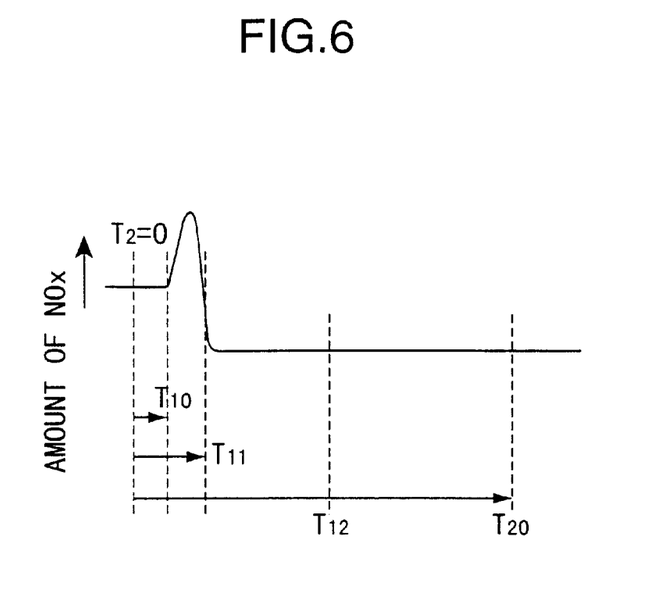
FIG. 6 is a time chart showing the control operation performed in the engine of the embodiment.

In step S18, a judgment is made to check whether $T_1 \geq T_{12}$, where $T_{12}$ is a point in time (from which the air-fuel ratio begins to become high) that occurs after the point in time $T_{11}$, as shown in FIG. 6. If $T_1 \geq T_{12}$ in step S18, the NOx release control execute flag F1 is reset in step S19 and the operation flow proceeds to step S20. If $T_1 < T_{12}$ in step S18, the operation flow proceeds to step S23.

If the estimated amount of the absorbed NOx is smaller than NO (absorbed NOx<NO) in step S11, the operation flow proceeds to step S13, in which a judgment is made to check whether the NOx release control execute flag F1 is currently set to 1. If the judgment result in step S13 is in the affirmative, the operation flow proceeds to step S14. If the judgment result in step S13 is in the negative, that is, the NOx release control execute flag F1 is not currently set, the NOx release control execute flag F1 is reset in step S21 and $T_1$ is reset to 0 in step S22. Then, the operation flow proceeds to step S20.

In step S20, the amount of absorbed SOx is estimated. This estimation is made based on the distance traveled and the total amount of fuel injected since a sulfur release control operation was last executed, as well as on a time period during which the temperature of the NOx-absorbing material 36 is low. The estimated amount of the absorbed SOx is compared with its reference value SO in step S23 of FIG. 5. If the estimated amount of the absorbed SOx is equal to or greater than SO (the quantity of absorbed SOx$\geq$SO), a sulfur release control execute flag F2 is set in step S24 and exhaust gas temperature Tc is estimated in step S25. The estimation of the exhaust gas temperature Tc is made based on a time period during which the air-fuel ratio has been high and a time period during which time-split injection has been made, for instance. When the sulfur release control execute flag F2 has been set in step S24, a later-described ignition retard control operation and the EGR control operation are performed with specific timing.

The estimated exhaust gas temperature Tc is compared with its reference value Tc0 in step S26. If Tc$\geq$Tc0, count value T2 of a timer is incremented by 1 in step S27, and a judgment is made to check whether T2$\geq$T10 in step S28. If T2$\geq$T10 in step S28, the earlier fuel injection quantity Tm is set to Tm4+Tcm (additional fuel quantity), the later fuel injection quantity Tt is set to Tt4 +Tct (additional fuel quantity), the earlier injection point basic value Im is set to Im4, and the later injection point basic value It is set to It4 in step S29. These settings are made to perform time-split injection at a low air-fuel ratio ($\lambda \leq 1$ for a rich mixture) to increase the amount of CO. As a result of these settings, it becomes possible to previously supply CO in sufficient quantity for reducing the NOx released from the NOx-absorbing material 36.

Subsequently, time T20 is set in step S30 and a judgment is made to check whether T2$\geq$T20 in step S31. If T2$\geq$T20 in step S31, the sulfur release control execute flag F2 is reset to 0 in step S32 and the operation flow proceeds to step S33.

On the other hand, if T2<T10 in step S28, additional fuel quantity Tcm is set to 0 and additional fuel quantity Tct is set to 0 in step S34. Then, a judgment is made to determine whether the cylinder 12 into which the fuel is to be injected next is the first or fourth cylinder 12 in step S35. If the judgment result in step S35 is in the negative, the operation flow proceeds to step S29 to perform time-split injection at an excess-air factor of $\lambda \leq 1$ to increase the amount of CO as described above. If the judgment result in step S35 is in the affirmative, that is, the fuel is to be injected into the first or fourth cylinder 12 next, the operation flow proceeds to step S30. As a result, the second and third cylinders 12 are operated in the time-split injection mode at a low air-fuel ratio and the CO concentration in the exhaust gas from these cylinders 12 becomes high. Consequently, the CO discharged from the second and third cylinders 12 reacts with oxygen discharged from the first and fourth cylinders 12, and the resultant heat of reaction promotes temperature increase.

If the estimated amount of the absorbed SOx is smaller than its reference value SO (the quantity of absorbed SOx<SO) in step S23, the operation flow proceeds to step S36, in which a judgment is made to check whether the sulfur release control execute flag F2 is currently set to 1. If the judgment result in step S36 is in the affirmative, the operation flow proceeds to step S25. If the judgment result in step S36 is in the negative, T2 is reset to 0 in step S37, the sulfur release control execute flag F2 is reset to 0 in step S38, and the operation flow proceeds to step S33.

In step S33, a judgment is made to check whether the earlier fuel injection quantity Tm is equal to 0. If the judgment result in step S33 is in the negative (Tm$\neq$0), a further judgment is made in step S39 to check whether the earlier injection point Im has been reached. When the earlier injection point Im has been reached, the fuel is injected as much as the earlier fuel injection quantity Tm in step S40, and the operation flow proceeds to step S41. On the other hand, if Tm=0 in step S33, the operation flow proceeds to step S41.

In step S41, a judgment is made to check whether the later fuel injection quantity Tt is equal to 0. If the judgment result in step S41 is in the negative (Tt$\approx$0), a further judgment is made to check whether the later injection point It has been reached in step S42. When the later injection point It has been reached, a control command is issued in step S43 to inject the fuel as much as the later fuel injection quantity Tt. According to the foregoing steps, time-split injection is made when neither of the earlier and later fuel injection quantities Tm, Tt is zero, and in this case, the amount of the constituent reducing agent (CO) in the reductant is increased and the NOx in the NOx-absorbing material 36 is reduced.

Figure 7:
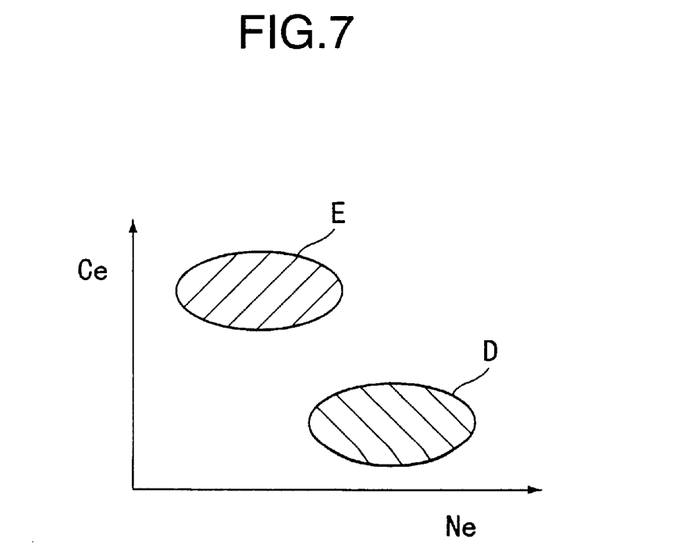
FIG. 7 is a diagram showing part of the control operation performed in the engine of the embodiment.

The aforementioned time-split injection control operation is applicable to a case in which the engine load Ce is low as shown by region "D" in FIG. 7. In high engine load region "E" shown in FIG. 7, it is preferable to mainly perform the ignition retard control operation. More specifically, since the temperature is increased in the region E, it is preferable to increase the amount of ignition retardation in the region E than in the region D, prohibit the time-split injection control operation in the region E, and increase EGR control amount in the region D than in the region E. By mainly performing the ignition retard control operation in high-load conditions, it is possible to promote temperature increase while preventing the occurrence of knocking in a region in which it is difficult to recirculate the exhaust gas. Also by performing the time-split injection control operation and EGR control operation in low-load conditions, it is possible to make time-split injection which can easily produce a stratified mixture, and to perform the EGR control operation under conditions in which exhaust gas recirculation can be easily made.

Engine speed fluctuation increases if the ignition retard control operation is mainly performed in the low/medium-speed, low-load operating range. Therefore, it is preferable to give priority to the time-split injection control operation and EGR control operation in low-load conditions, rather than to the ignition retard control operation, in the low/medium-speed, low-load operating range Ignition Retard Control Referring to FIG. 8, the ignition retard controller 50 initiates its control operation at specific crank angles. Specifically, the ignition retard controller 50 takes in such data as the engine load Ce and the engine speed Ne in step S100 and sets a basic ignition point θB based on these data in step S101. Then, a judgment is made to check whether the sulfur release control execute flag F2 for the aforementioned time-split injection is currently set in step S102. If the judgment result in step S102 is in the affirmative, a first ignition point correction value θc1 is set in step S103, where the first ignition point correction value θc1 (which specifies the amount of ignition retardation) is made smaller in the region D of FIG. 7, larger in the region E. Then in step S104, a judgment is made to check whether $T_2 \geq T_{10}$. If the judgment result in step S104 is in the negative, a second ignition point correction value θc2 (which specifies the amount of ignition retardation) is set to 0 in step S105. This setting is made to give priority to fuel economy in an initial stage in which the amount of sulfur released is small. Subsequently, ignition point θT is calculated by the equation θT=θB+θc1+θc2 in step S106.

Figure 8:
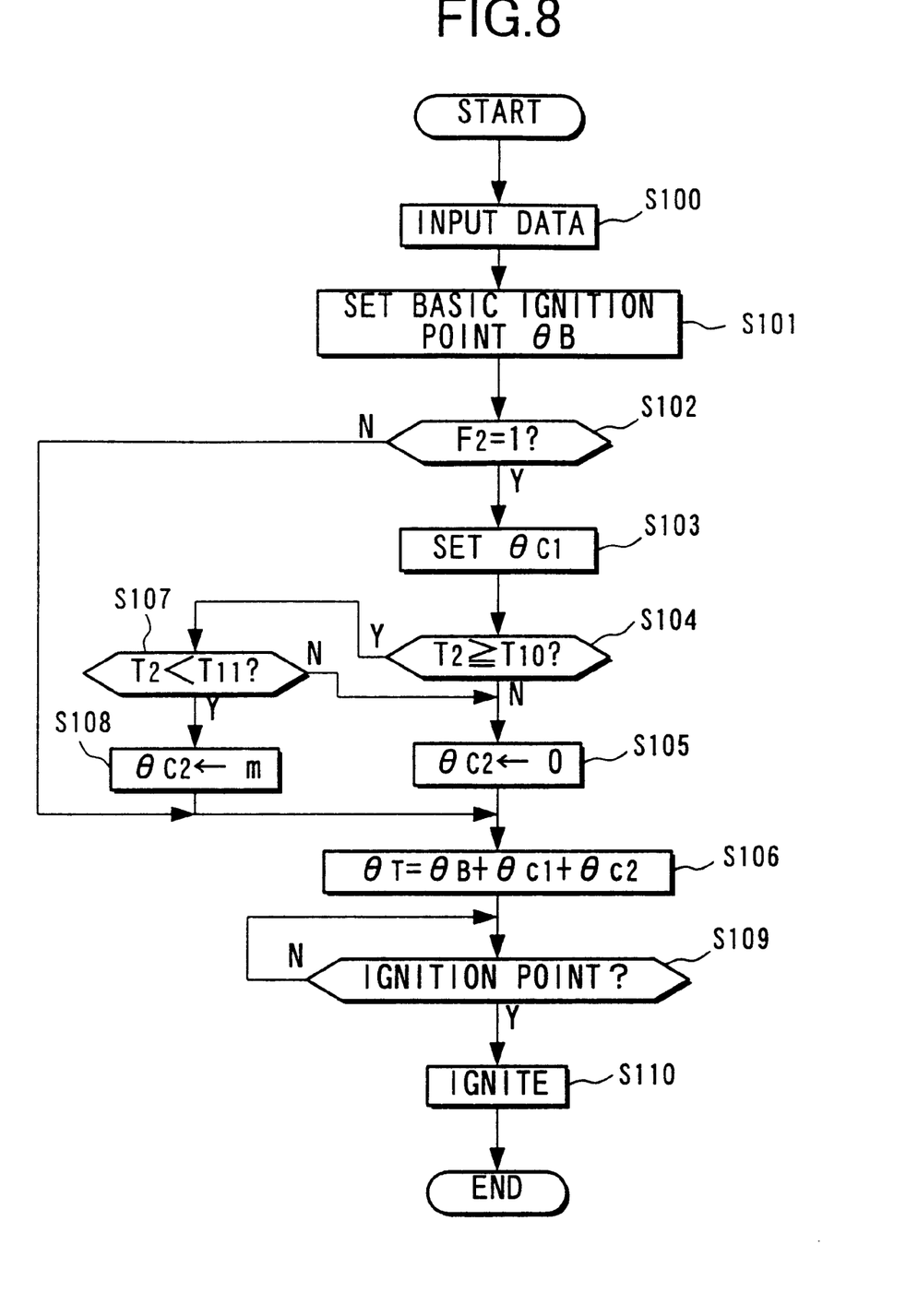
FIG. 8 is a flowchart showing operational steps of an ignition retard control operation which is part of overall control of the engine of the embodiment.

If the judgment result in step S102 is in the negative, that is, the sulfur release control execute flag F2 is not set, the operation flow proceeds to step S106. Also, if $T_2 \geq T_{10}$ in step S104, a further judgment is made to check whether $T_2 < T_{11}$ in step S107. If the judgment result in step S107 is in the negative, the operation flow proceeds to step S105. If $T_2 < T_{11}$ (i.e., $T_{11} > T_2 \geq T_{10}$) in step S107, the second ignition point correction value θc2 is set to m(>0) in step S108 and the operation flow proceeds to step S106. This setting is made to increase the temperature of the NOx-absorbing material 36 and to increase the amount of CO, disregarding the fuel economy. Here, a judgment is made in step S109 to check whether the ignition point θT calculated in step S106 has been reached. When the ignition point θT has been reached, the mixture is ignited in step S110. According to the foregoing steps, it is possible to remarkably increase the concentration of the constituent reducing agent (CO) and the temperature of the NOx-absorbing material 36 when the amount of released NOx reaches its maximum point.

EGR Control

Figure 9:
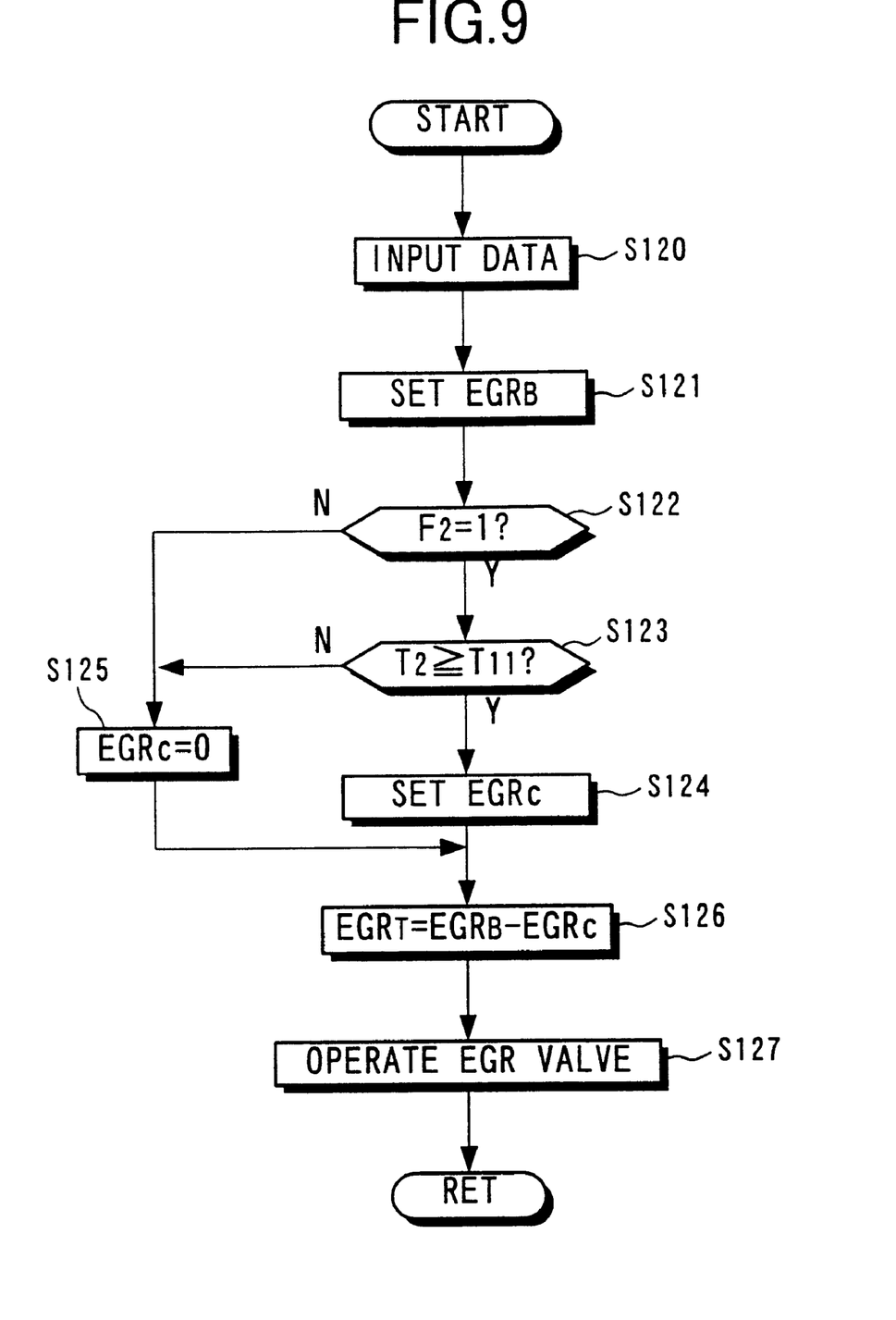
FIG. 9 is a flowchart showing operational steps of an EGR control operation which is part of the overall control of the engine of the embodiment.

Referring to FIG. 9, the EGR controller 48 initiates its control operation at specific crank angles. Specifically, the EGR controller 48 takes in such data as the engine load Ce and the engine speed Ne in step S120 and sets a basic EGR quantity EGRB, such as EGR valve opening determined based on EGR ratio, in step S121. Then, a judgment is made in step S122 to check whether the sulfur release control execute flag F2 for the aforementioned control operation performed by the reductant concentration controller 46 is currently set. If the judgment result in step S122 is in the affirmative, a further judgment is made to check whether $T_2 \geq T_{11}$ in step S123. If $T_2 \geq T_{11}$ in step S123, an EGR correction value EGRC for reducing the amount of the recirculated exhaust gas is set in step S124. Here, even if the same EGR correction value EGRc, or the same EGR valve opening, is applied to the regions D and E of FIG. 7, a greater amount of exhaust gas is recirculated in the low-load region D. It is however preferable that the EGR correction value EGRc be made larger in the region D than in the region E. In succeeding step S126, true EGR quantity EGRT is calculated by the equation EGRT=EGRB-EGRC.

If it is judged that F2 1 in step S122 or $T_2 < T_{11}$ in step S123, the EGR correction value EGRC is set to 0 in step S125 and the operation flow proceeds to step S126. Subsequently, the EGR valve 33 is operated with the true EGR quantity EGRT thus obtained in step S127. According to the aforementioned engine control device of the embodiment, when the reductant concentration controller 46 constituting the desulfurization controller decreases a quantity related to the EGR ratio, the exhaust gas temperature increases, causing an increase in the temperature of the NOx-absorbing material 36. As a consequence, sulfur within the NOx-absorbing material 36 is freed and released. Since the quantity related to the EGR ratio is decreased by the EGR valve 33 which is already provided in the engine having the capability of performing the EGR control operation, it is not necessary to additionally provide a space-consuming desulfurization control device. It is therefore appreciated that the invention makes it possible to achieve space savings without causing cost increase.

When the ignition retard control operation and time-split injection are performed before decreasing the quantity related to the EGR ratio as in the engine control device of this embodiment, it is possible to increase the amount of the constituent reducing agent (CO) and improve the efficiency of eliminating the sulfur within the NOx-absorbing material 36 compared to a case in which only the EGR control operation is performed. Furthermore, if the ignition retard control operation or time-split injection is first performed and the amount of the recirculated exhaust gas is reduced after the amount of NOx released from the NOx-absorbing material 36 has reached its maximum point, the amount of raw NOx (which is contained in the exhaust gas prior to catalytic conversion) is decreased by exhaust gas recirculation until the amount of the released NOx reaches its maximum point. Since the amount of the reductant consumed for reducing the raw NOx is decreased, the effect of reducing the released NOx is enhanced and the maximum amount of the released NOx can be lowered. When the amount of the released NOx is decreased in this manner, it becomes possible to achieve a temperature increase by reducing the amount of the recirculated exhaust gas (or cutting off the recirculated exhaust gas). It is to be noted that either the ignition retard control operation or time-split injection may be performed alone, instead of performing both.

Figure 10:
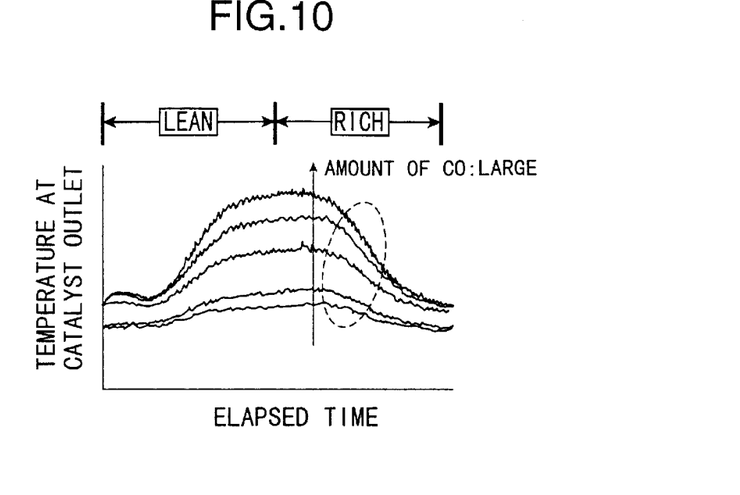
FIG. 10 is a graph showing a temperature increasing effect obtained when an NOx absorbing material contains ceria ($CeO_2$)

FIG. 10 is a graph showing a temperature increasing effect obtained when the NOx-absorbing material 36 contains ceria ($CeO_2$), in which the horizontal axis represents elapsed time and the vertical axis represents the temperature at an outlet of the NOx-absorbing material 36.

When the exhaust gas becomes rich and the amount of oxygen decreases in a region surrounded a broken line of FIG. 10, the exhaust gas temperature would quickly decrease if the NOx-absorbing material 36 does not contain ceria, because neither HC nor CO can be reacted in this condition. If the NOx-absorbing material 36 contains ceria, however, oxygen is supplied from the ceria for a while, so that oxidation of HC and CO continues. This serves to maintain high temperatures.

Figure 11A:
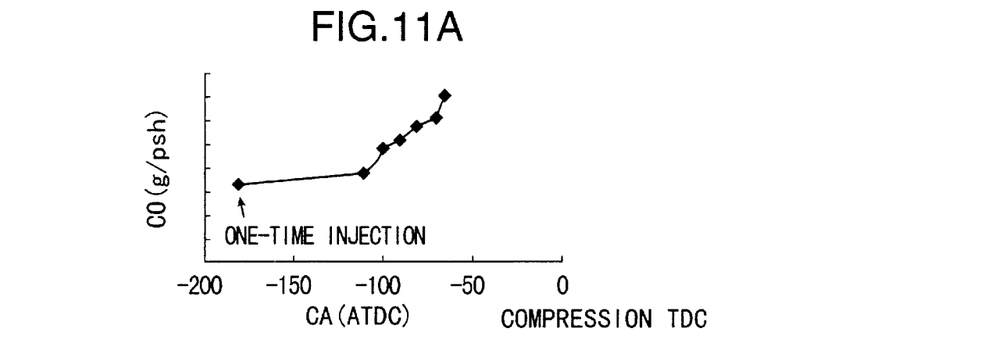
FIGS. 11A and 11B are graphs showing an effect obtained when time-split injection was performed with the air-fuel ratio set to make the excess-air factor $\lambda$ approximately equal to but smaller than 1 ($\lambda \leq 1$) in the aforementioned embodiment.
Figure 11B:
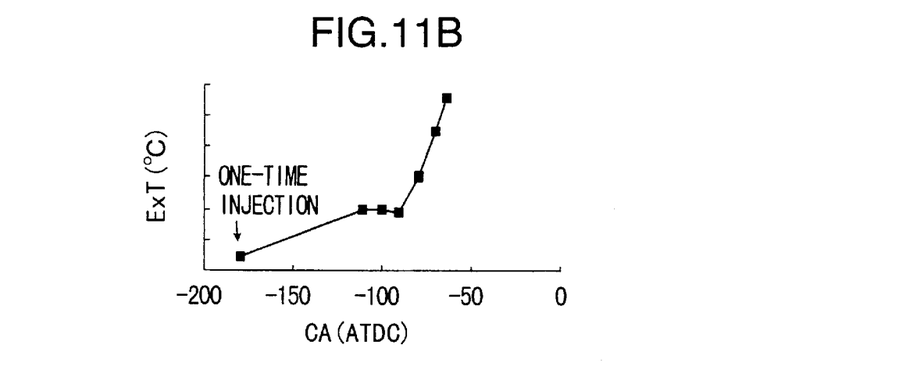

FIGS. 11A and 11B are graphs showing an effect obtained when time-split injection was performed to make the excess-air factor $\lambda$ approximately equal to 1 ($\lambda \approx 1$) in the aforementioned embodiment. More specifically, FIGS. 11A and 11B show data on the CO concentration and exhaust gas temperature obtained when the later injection timing was varied with the earlier injection timing kept at a fixed point (e.g., $-300°$ CA relative to the compression top dead center). In these graphs, the horizontal axis represents the crank angle relative to the compression top dead center, or after the top dead center (ATDC). Only the leftmost small squares in these graphs represent test results obtained when one-time injection was performed, while the remaining small squares represent test results obtained when time-split injection was performed. The ratio of the amount of fuel injected in the earlier injection cycle to the amount of fuel injected in the later injection cycle in testing was 1:1.

As can be seen from FIGS. 11A and 11B, when time-split injection is performed at $\lambda \leq 1$, the exhaust gas becomes rich in CO and the exhaust gas temperature increases. Both the amount of CO and the exhaust gas temperature significantly increase especially in a range of 90° to 50° before the compression top dead center, and this serves to improve the efficiency of eliminating the sulfur from the NOx-absorbing material 36.

It is to be pointed out that the invention is not limited to the foregoing embodiment but is applicable to the following embodiments as well.

While the engine control device of the foregoing embodiment has the capability to perform the EGR control operation, the invention is also applicable to an engine in which the EGR control operation is not performed. As an example, the invention may be applied to a construction including an NOx-absorbing material which is provided in an exhaust passage, absorbs NOx in an oxygen-rich atmosphere, and releases NOx and absorbs sulfur content when the oxygen concentration drops, a discriminator for judging whether the amount of sulfur absorbed by the NOx-absorbing material is equal to or smaller than a specific reference value, and a reductant concentration controller which performs an ignition retard control operation or at least two-step time-split injection during a period from an intake stroke to a succeeding compression stroke, or both, based on the result of judgment made by the discriminator, wherein the reductant concentration controller gives high priority to the ignition retard control operation. According to this construction, it is possible to increase the temperature of the NOx-absorbing material without performing the EGR control operation and the occurrence of knocking can be prevented.

Although the fuel is injected twice, firstly in the intake stroke and secondly in the compression stroke, in the earlier-mentioned embodiment, it may be injected three or more times in successive steps. In this variation, the first two injection cycles may occur during the intake stroke.

Although the invention is applied to the direct injection engine in the foregoing embodiment, the invention is not limited thereto but is widely applicable to engines having adjacent operating ranges in which different target amounts of recirculated exhaust gas are set. In a port injection engine in which the fuel is injected into an intake port upstream of an intake valve, for example, it is desirable to decrease the amount of the recirculated exhaust gas or retard the ignition timing when the amount of absorbed sulfur increases in an operating range in which a high target amount of recirculated exhaust gas is set (e.g., in an operating range in which stratified charge combustion is made by injecting the fuel in a latter part of each intake stroke and producing a swirl).

As described above, an inventive engine control device is adapted for controlling an engine provided with a fuel injection valve for supplying the engine with fuel, an EGR regulator for recirculating part of exhaust gas to an intake air line, an NOx-absorbing material arranged in an exhaust passage for discharging the exhaust gas from a combustion chamber for absorbing NOx in an oxygen-rich atmosphere, and releasing NOx and absorbing sulfur content when the oxygen concentration drops, and includes a discriminator for judging whether the amount of sulfur absorbed by the NOx-absorbing material has reached a prescribed quantity, and a desulfurization controller which causes the EGR regulator to decrease EGR ratio to increase the temperature of the NOx-absorbing material and thereby desulfurizes the NOx-absorbing material when the amount of sulfur absorbed by the NOx-absorbing material is judged to have reached or exceeded the prescribed quantity based on the result of judgment made by the discriminator.

In this construction, when the desulfurization controller decreases a quantity related to the EGR ratio, the exhaust gas temperature increases, causing an increase in the temperature of the NOx-absorbing material. As a consequence, sulfur within the NOx-absorbing material is freed and released. Since the quantity related to the EGR ratio is decreased by the EGR regulator which is already provided in the engine having the capability of performing EGR control operation, it is not necessary to additionally provide a space-consuming desulfurization control device. This makes it possible to achieve space savings without causing cost increase.

The prescribed quantity of absorbed sulfur is a quantity from which the NOx-absorbing ability of the NOx-absorbing material becomes lower than a specified level as a result of adsorption of sulfur.

The aforementioned desulfurization controller may include a reductant concentration controller which performs a control operation for increasing the concentration of a reductant contained in the exhaust gas.

According to this construction, the concentration of the reductant (e.g., carbon monoxide) can be increased by means of the reductant concentration controller while increasing the temperature of the NOx-absorbing material. It is therefore possible to promote desulfurization of the NOx-absorbing material.

The control device may be constructed such that the reductant concentration controller begins the control operation for increasing the concentration of the reductant and decreases a quantity related to the EGR ratio after the amount of NOx released from the NOx-absorbing material has reached its maximum point when the discriminator has judged that the amount of sulfur absorbed by the NOx-absorbing material has reached the prescribed quantity.

In this construction, the amount of raw NOx (which is contained in the exhaust gas prior to catalytic conversion) is decreased by exhaust gas recirculation while the amount of the released NOx is large. Since the amount of the reductant consumed for reducing the raw NOx is decreased, the effect of reducing the released NOx is enhanced and the maximum amount of the released NOx can be lowered. (When the amount of NOx decreases, it becomes possible to achieve a temperature increase by cutting off the recirculated exhaust gas.)

The reductant concentration controller may be so constructed as to perform at least an air-fuel ratio control operation for increasing the amount of injected fuel relative to the amount of intake air to decrease the air-fuel ratio so that excess-air factor $\lambda$ becomes equal to or smaller than 1, or an ignition retard control operation.

This construction makes it possible to easily increase the concentration of a reductant by the air-fuel ratio control operation or by the ignition retard control operation.

In the case that the engine is provided with an injector for injecting the fuel directly into the combustion chamber, and the reductant concentration controller causes the injector to make at least two-step time-split injection during a period from an intake stroke to a succeeding compression stroke when performing the air-fuel ratio control operation, it is preferable to set the air-fuel ratio such that the excess-air factor $\lambda$ becomes approximately equal to 1. This construction makes it possible to increase the temperature of the NOx-absorbing material without causing a significant deterioration in fuel economy.

The reductant concentration controller may be so constructed as to increase the amount of ignition retardation before the amount of NOx released from the NOx-absorbing material reaches its maximum point when performing the ignition retard control operation. This construction makes it possible to remarkably increase the concentration of CO which serves as a constituent reducing agent and promote temperature increase of the NOx-absorbing material when the amount of released NOx reaches its maximum point.

The reductant concentration controller may be so constructed as to increase the air-fuel ratio in at least one cylinder and decrease the air-fuel ratio in any other cylinder so that the excess-air factor $\lambda$ in the latter cylinder becomes approximately equal to or smaller than 1 before performing the air-fuel ratio control operation. This construction makes it possible to supply the constituent reducing agent for increasing the amount of released NOx in advance.

The reductant concentration controller may be so constructed as to produce at least two-step time-split injection during a period from an intake stroke to a succeeding compression stroke into the cylinder whose excess-air factor $\lambda$ is made equal to or smaller than 1. In this construction, the concentration of the constituent reducing agent (CO) becomes high since time-split injection is performed in the cylinder whose air-fuel ratio is low. The reducing agent (CO) rapidly reacts with oxygen ($O_2$) discharged from the cylinder whose air-fuel ratio is high, so that it is possible to increase the temperature of the NOx-absorbing material and improve the efficiency of eliminating sulfur from the NOx-absorbing material.

The reductant concentration controller may be so constructed as to produce at least two-step time-split injection during a period from an intake stroke to a succeeding compression stroke before performing the air-fuel ratio control operation. This construction makes it possible to remarkably increase the concentration of the constituent reducing agent and the temperature of the NOx-absorbing material when the amount of released NOx reaches its maximum point. Moreover, the temperature of the NOx-absorbing material can be increased in advance.

The amount of ignition retardation is made larger in high-load conditions than in low-load conditions. This construction makes it possible to promote desulfurization of the NOx-absorbing material while preventing the occurrence of knocking by ignition retardation in a high-load range in which engine knocking is likely to occur and deterioration in combustibility tends to be caused by exhaust gas recirculation or time-split injection.

The amount of controlling the EGR ratio is made larger in low-load conditions than in high-load conditions.

Further, the control device may be so constructed as to perform a desulfurization control operation by executing the ignition retard control operation while prohibiting time-split injection in high-load conditions and perform the desulfurization control operation by making time-split injection in low-load conditions. In this construction, the amount of CO can be increased by performing time-split injection in a low-load range in which a stratified mixture can be easily produced.

Moreover, an inventive engine control device is adapted for controlling an engine provide with a fuel injection valve for injecting fuel directly into a combustion chamber of the engine, an ignition timing controller for controlling ignition timing, an NOx-absorbing material arranged in an exhaust passage for discharging exhaust gas from the combustion chamber for absorbing NOx in an oxygen-rich atmosphere, and releasing NOx and absorbing sulfur content when the oxygen concentration drops, and includes a discriminator for judging whether the amount of sulfur absorbed by the NOx-absorbing material has reached a prescribed quantity, and a desulfurization controller which causes the ignition timing controller to perform an ignition retard control operation or the fuel injection valve to inject the fuel at least twice during a period from an intake stroke to a succeeding compression stroke based on the result of judgment made by the discriminator in order to desulfurize the NOx-absorbing material by increasing its temperature. The desulfurization controller performs a desulfurization control operation by executing the ignition retard control operation while prohibiting time-split injection in high-load conditions and performs the desulfurization control operation by making time-split injection in low-load conditions when the discriminator has judged that the amount of sulfur absorbed by the NOx-absorbing material has reached or exceeded the prescribed quantity.

According to this construction, it is possible to increase the amount of CO and the exhaust gas temperature by performing the ignition retard control operation or time-split injection. This serves to promote desulfurization of the NOx-absorbing material. This construction is particularly effective for preventing knocking in high-load ranges since ignition retardation and time-split injection can be selectively performed depending on operating conditions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An engine control device for controlling an engine provided with a fuel injection valve for supplying the engine with fuel, an EGR regulator for recirculating part of exhaust gas to an intake air line, an NOx-absorbing material arranged in an exhaust passage for discharging the exhaust gas from a combustion chamber for absorbing NOx in an oxygen-rich atmosphere, and releasing NOx and absorbing sulfur content when the oxygen concentration drops, and an air-fuel ratio controller for controlling an air-fuel ratio, the engine control device comprising;

a NOx-absorbing state judging unit for judging whether the amount of NOx absorbed in the NOx-absorbing material has reached a predetermined quantity;

a NOx releasing controller for switching the air-fuel ratio from lean to rich over a first period of time to release the absorbed NOx from the NOx-absorbing material;

an absorbed sulfur state judging unit for judging whether the amount of sulfur absorbed by the NOx-absorbing material has reached a predetermined quantity; and     a desulfuirization controller for causing the EGR regulator to decrease the EGR ratio over a second period of time that is longer than the first period of time to release the absorbed sulfur from the NOx-absorbing material when the amount of sulfur absorbed in the NOx-absorbing material is judged by the absorbed sulfur state judging unit to have reached a predetermined quantity.

2. The control device according to claim 1, wherein the predetermined quantity of absorbed sulfur is a quantity from which the NOx-absorbing ability of the NOx-absorbing material becomes lower than a specified level as a result of adsorption of sulfur.

3. The control device according to claim 2, wherein the desulfurization controller includes a reductant concentration controller which performs a control operation for increasing the concentration of a reductant contained in the exhaust gas.

4. The control device according to claim 3, wherein the reductant concentration controller begins the control operation for increasing the concentration of the reductant and decreases a quantity related to the EGR ratio after the amount of NOx released from the NOx-absorbing material has reached its maximum point when the discriminator has judged that the amount of sulfur absorbed by the NOx-absorbing material has reached the prescribed quantity.

5. The control device according to claim 4, wherein the reductant concentration controller performs at least the air-fuel ratio control operation for increasing the amount of injected fuel relative to the amount of intake air to decrease the air-fuel ratio so that excess-air factor λ becomes equal to or smaller than 1, or an ignition retard control operation.

6. The control device according to claim 5, wherein the engine is provided with an injector for injecting the fuel directly into the combustion chamber, and the reductant concentration controller causes the injector to make at least two-step time-split injection during a period from an intake stroke to a succeeding compression stroke when performing the air-fuel ratio control operation.

7. The control device according to claim 6, wherein the control device performs a desulfurization control operation by executing the ignition retard control operation while prohibiting time-split injection in high-load conditions and performs the desulfurization control operation by making time-split injection in low-load conditions.

8. The control device according to claim 5, wherein the reductant concentration controller increases the amount of ignition retardation before the amount of NOx released from the NOx-absorbing material reaches its maximum point when performing the ignition retard control operation.

9. The control device according to claim 5, wherein the reductant concentration controller increases the air-fuel ratio in at least one cylinder and decreases the air-fuel ratio in any other cylinder so that the excess-air factor λ in the latter cylinder becomes approximately equal to or smaller than 1 before performing the air-fuel ratio control operation.

10. The control device according to claim 9, wherein the reductant concentration controller produces at least two-step time-split injection during a period from an intake stroke to a succeeding compression stroke into the cylinder whose excess-air factor λ is made equal to or smaller than 1.

11. The control device according to claim 5, wherein the reductant concentration controller produces at least two-step time-split injection during a period from an intake stroke to a succeeding compression stroke before performing the air-fuel ratio control operation.

12. The control device according to claim 5, wherein the amount of ignition retardation is made larger in high-load conditions than in low-load conditions.

13. The control device according to claim 12, wherein the amount of controlling the EGR ratio is made larger in low-load conditions than in high-load conditions.

14. The control device according to claim 1, wherein the desulfurization controller controls the air-fuel ratio controller to set the air-fuel ratio to be a theoretical rich air-fuel ratio or lower over the second period of time.

15. The control device according to claim 1, further comprising an ignition timing controller for controlling an ignition timing in accordance with an engine running condition, and wherein the desulfurization controller controls the ignition timing controller to retard the ignition timing in a greater amount in high-load condition than in low-load condition.

16. The control device according to claim 15, wherein the desulfurization controller controls the EGR regulator to decrease the EGR ratio in such a manner that the EGR ratio becomes larger in lowload condition than in high-load condition.

17. The control device according to claim 1, wherein the fuel injection valve injects the fuel directly into the combustion chamber and the desulfurization controller causing the fuel injection valve to inject fuel at least twice during a time period from an intake stroke to a succeeding compression stroke over the second period of time.

18. An engine control device for controlling an engine provided with a fuel injection valve for injecting fuel directly into a combustion chamber of the engine, an ignition timing controller for controlling ignition timing, an NOx-absorbing material arranged in an exhaust passage for discharging exhaust gas from the combustion chamber for absorbing NOx in an oxygen-rich atmosphere, and releasing NOx and absorbing sulfur content when the oxygen concentration drops, and an air-fuel ratio controller for controlling an air-fuel ratio, the engine control device comprising:

a NOx-absorbing state judging unit for judging whether the amount of NOx absorbed in the NOx-absorbing material has reached a predetermined quantity;

a NOx releasing controller for switching the air-fuel ratio from lean to rich over a first period of time to release the absorbed NOx from the NOx-absorbing material;

an absorbed sulfur state judging unit for judging whether the amount of sulfur absorbed by the NOx-absorbing material has reached a predetermined quantity;

a sulfur absorbing state judging unit for judging whether the amount of sulfur absorbed in the NOx-absorbing material has reached a predetermined quantity; and     a desulfurization controller for causing the fuel injection valve to inject the fuel at least twice during a time period from an intake stroke to a succeeding compression in such a manner as to retard the ignition timing more in high-load condition than in the low-load condition over a second period of time that is longer than the first period of time to release the absorbed sulfur from the NOx-absorbing material when the amount of sulfur absorbed in the NOx-absorbing material is judged by the absorbed sulfur state judging unit to have reached the predetermined quantity.

* * * * *